Patented July 26, 1938

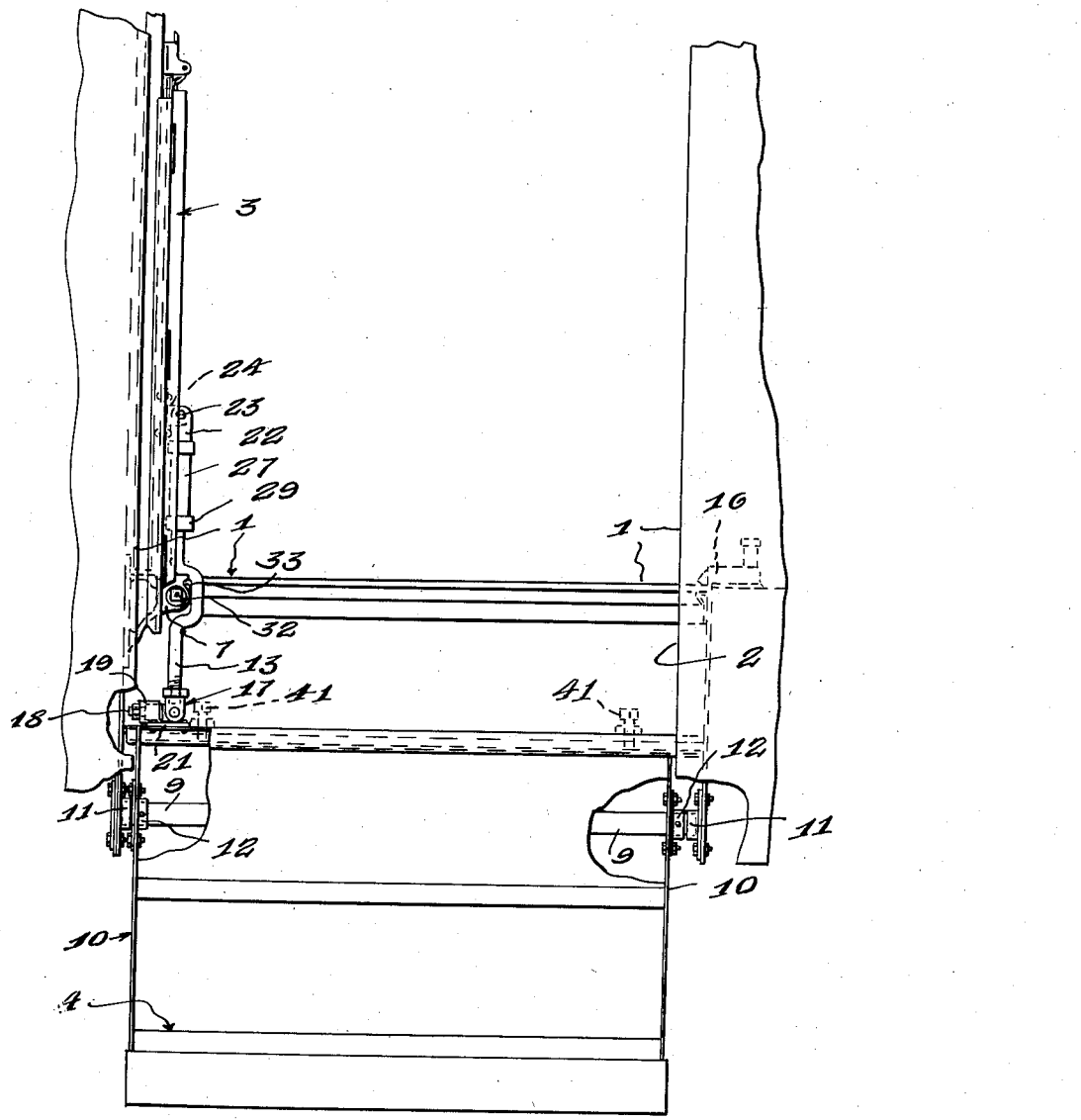

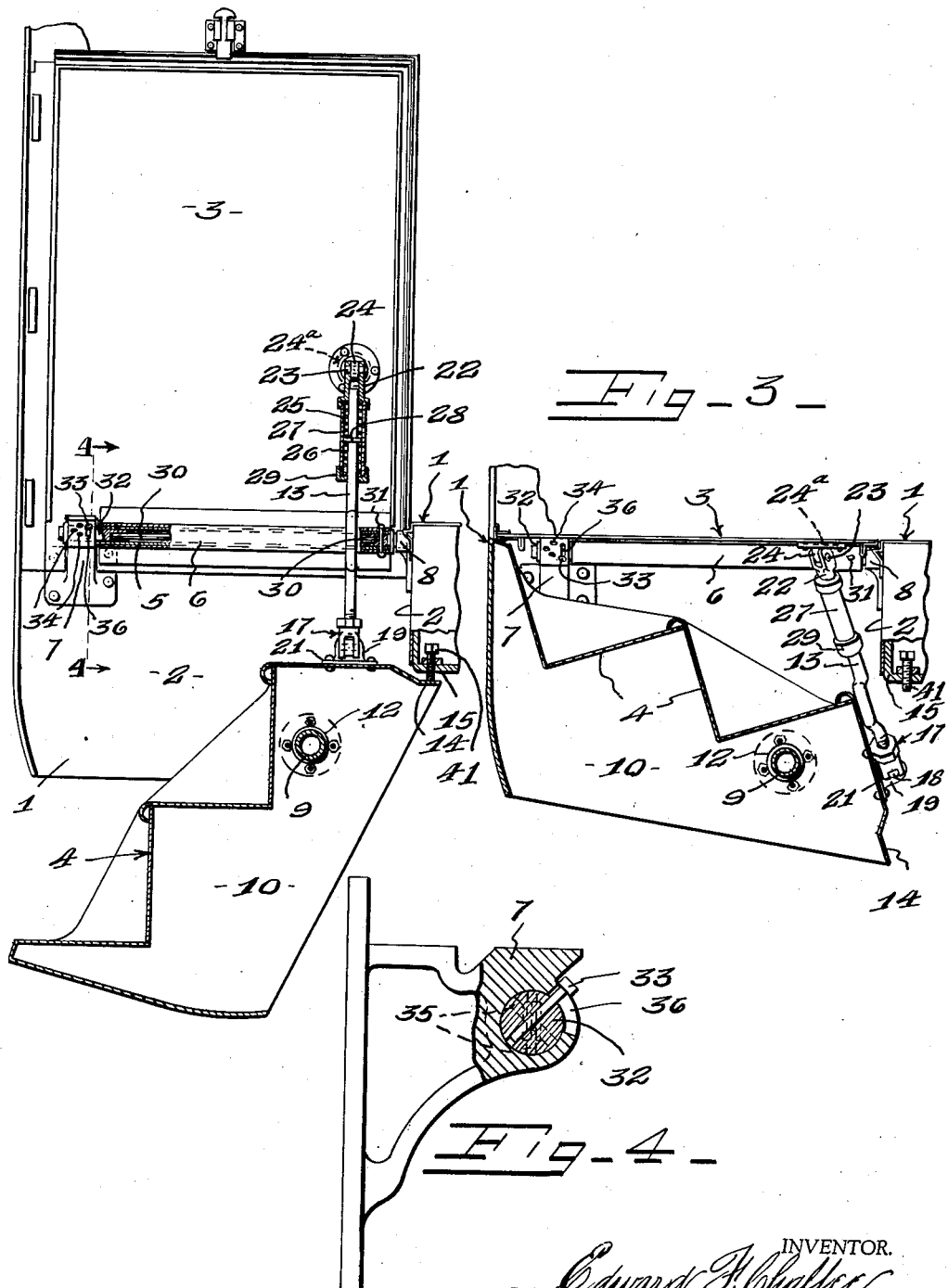

2,124,872

UNITED STATES PATENT OFFICE 2,124,872

RAILWAY CAR TRAP DOOR AND FOLDING STEP CONSTRUCTION

Edward F. Chaffee, Syracuse, N. Y., assignor to The O. M. Edwards Company, Inc., Syracuse, N. Y., a corporation of New York Application October 2, 1936, Serial No. 103,746

6 Claims. (Cl. 105—447)

This invention relates to combined trap door and folding steps used in vestibules of cars of streamlined trains of the general type shown in the application of Roy T. Axe, Serial Number 15,639, filed April 10, 1935 and has for its object a combined trap door and folding step construction in which the trap door unit and step unit are initially balanced as near as possible through motion transmitting connections between them, so that one balances the other when the trap door and steps reach a partly open position, or one has a certain balancing effect or slightly over-balancing effect relative to the other, when the trap door and steps are open, without the use of springs, and means acting on either the trap door or the step, adjustable to initially obtain the predetermined balancing effect in the event the avoirdupois weights of the trap door and the step do not in themselves accomplish the predetermined balancing effect, or adjustable to correct any variation of the predetermined balancing effect that may develop in the trap door and step while in use.

More specifically, it has for its object a normally idle spring embodied in the structure and being inactive in the event the trap door and the steps balance each other and being adjustable to tension it in either direction to increase or decrease the balancing effect of one relative to the other, in order to obtain a predetermined balancing effect between the steps and the trap door, that is, the spring may be tensioned in one direction to, in effect, lessen the opposing effect of the trap door to the step, or, in the opposite direction to increase the opposition of the trap door to the steps.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation, partly in section, of a car structure showing in front elevation, the steps when the trap door and the steps are open.

Figure 2 is an elevation taken at a right angle to Figure 1, or looking to the left in Figure 1.

Figure 3 is a view similar to Figure 2 showing the trap door and the steps in closed position.

Figure 4 is an enlarged fragmentary view of the means for adjusting the spring for obtaining a predetermined balancing effect between the trap door and the steps, this being taken on the plane of line 4—4, Figure 2, in which the trap door is open.

1 designates a platform structure of the vestibule of a railway car, which is formed with a trap door opening 2. 3 designates the trap door, and 4 a flight of steps mounted to open or unfold into operative position, when the trap door is open and to close or fold up into closed position when the trap door is closed. The trap door 3 is hinged at one edge to the platform structure at one side of the trap door opening 2, the axis of the hinge extending transversely of the platform of the car, it being mounted upon a hinge pin 5 which extends through a hinge leaf or barrel 6 at one margin of the trap door and which is mounted at its ends in brackets 7, 8 on the platform structure at one side of the door opening 2.

The flight of steps 4 is pivotally mounted in the trap door opening on an axis extending lengthwise of the car structure and in a vertical plane at a right angle to the vertical plane of the axis of the trap door 3, it being here shown as having a shaft or tube 9 mounted in the side walls 10 of the step structure and extending beyond the side walls forming studs journalled in bearings 11 secured to the walls of the step passage 2. Reinforcing collars 12 are secured to the side walls 10 through which the tube extends, the collars being also fixed to the shaft 9 so that the shaft and steps rock as a unit. The shaft 9 is located relatively to the steps, so that the greater part or greater weight of the steps is to the outward of the axis of the shaft 9, so that the greater weight of the steps tends to move the steps by gravity to open position.

In the illustrated embodiment of my invention, the flight of steps includes three steps and the axis is located just to the rear of the riser of the second step from the bottom and beneath the tread of the top step of the flight.

The motion transmitting means between the trap door and the steps is here shown as a connecting rod 13 which is secured at its opposite ends to the under side of the trap door and to the flight of steps in rear of the shaft 9 or the axis of the steps 4 by joints having a universal action to compensate for the differential movements of the trap door and the steps. As shown, the connecting rod 13 is connected to the tread of the top step and in the rear of the vertical plane of the axis of the flight of steps. The connecting rod 13 is capable of extending and shortening against spring means to compensate for differential action of the trap door 3 and the steps 4 and also to permit continued opening movement of the door 3 when the steps reach open position and also continued closing movement of the trap door after the folding steps 4 reach their closed position. When the steps 4 reach their open position, a stop surface or flange 14 here shown as located at the rear edge of the tread of the top step abuts against a flange at 15 on the platform structure.

When the steps reach their closed position, the outer edge or the outer edge of the tread of the bottom step is in position to meet the trap door when the trap door is fully closed. The steps reach folded position however before the trap door is fully closed and due to the angularity and direction of thrust of the connecting rod 13, as shown in Figure 3, and of the theoretical lever arm between the shaft 9 and the lower end of the connecting rod 13, the folding steps do not move beyond their closed position during the final closing movement of the trap door 3.

The connecting rod 13 is constructed to elongate against spring action during the opening of the trap door after the folding steps have reached their final open position with the flange 14 engaged with the stop flange 15, so that continued opening movement of the trap door is against the action of the spring means in the connecting rod 13. During such continued movement, the connecting rod moves beyond a dead center line to self-locking position, that is, beyond a line passing through the axis of the trap door and the axis of the universal joint between the lower end of the connecting rod and the steps. When the steps have reached their final closed position in advance of the trap door, continued movement of the trap door into closed position causes the connecting rod 13 to shorten against the action of a compression spring. The trap door is held in its closed position by a latch 16 of any well known construction commonly used with the trap doors of railway cars.

The operation of the connecting rod 13 is substantially the same as that shown in the Axe application Serial No. 15,639, although the spring means in the connecting rod is slightly different from that shown in the Axe application. The connecting rod structure here shown consists of a rod which is secured at its lower end to a head or clevis 17 pivoted to one end of a stud 18 journalled in a horizontal or radial bearing 19 on a plate 21 secured in the tread of the top step of the flight of steps 4, and which, at its upper end, is slidably or telescopingly mounted in a head 22 pivoted at 23 to the end of a stud 24 having a base 24ª swivelly mounted in the trap door. Springs 25, 26 encircle the rod, these springs being located in a barrel 27 movable as a unit with the upper head 22. The rod has an annular shoulder 28 or spring abutment within the barrel. The spring 25 thrusts against the upper side of said shoulder 28 and the lower side of the upper head 22 and the spring 26 against the lower side of the shoulder 28 and a head or shoulder 29 at the lower end of the barrel. During the opening of the trap door, the spring 26 compresses, when the folding steps reach and are stopped in their extended position, and during closing of the trap door, the upper spring 25 compresses during the final closing of the trap door after the steps have reached their closed position. The rod telescopes during the lengthening and shortening of the connecting rod structure in the upper head 22.

The general operation, with the exception of the specific spring structure, is practically the same as in the Axe application referred to.

The trap door and the folding steps are so located that the avoirdupois weight of the steps slightly overbalances the weight of the trap door, so that when the latch 16 is released, the weight of the steps will slightly overbalance the weight of the trap door when closed and cause the trap door to partly open, say six inches, more or less. The porter continues to open the steps by hand, but the weight of the steps and trap door being balanced, only sufficient force is necessary to keep them in motion. However, due to changes that might be made in material, and to conditions that may develop during the use of the trap door, the original balance may be upset and hence, means is provided for adjusting the balance of the trap door and the steps initially, if such balancing is necessary, and also in order to maintain the balance in case it is upset by friction or lack of friction and other conditions that may develop during continued use of the structure. With the steps and the trap door both made of the same material, as for instance, aluminum or steel, the trap door and the steps are quite likely to balance properly without the use of adjusting means. However, if for instance, the steps are of aluminum and the trap door of steel, means for initially adjusting the balance is necessary. The balance may be adjusted by adding additional weight to the part that is too light, but preferably, easily operable adjusting means is provided, this being a spring so located as to be normally idle in case no adjustment is necessary and to be tensioned in one direction or the other to lighten the effective weight of the too heavy part or increase the weight of the too light part.

In the illustrated embodiment of my invention, the spring is applied to the trap door at the axis thereof, as the outer end of the trap door hinge is exposed and readily accessible, and the hinge of the steps is less accessible under the steps.

30 designates a spring, which is a laminated torque spring, of the usual construction used in railway car trap doors, it having one end anchored at 31 to the barrel 6 of the trap door and having its other end secured to a head 32, the head 32 being normally rotatable in the bracket 7 and as a unit with the barrel 6 of the trap door, so that the spring is idle or ineffective. The head 32 is provided with a wrench-hold by means of which it can be turned in one direction or the other to tension the spring, and a key 33 is provided for locking it in any one of a plurality of angular or radial positions in the bearing of the bracket 7, when the spring is tensioned, the key being applied through any one of a plurality of holes 34 in the bearing of the bracket 7 to enter any one of a plurality of holes 35 in the head 32 and located at different radial angles relatively to each other. The holes are to lock the head in various positions in accordance with the degree to which the spring is tensioned. The pin, when not in use, extends through a slot 36 (Figure 4) in the bearing of the bracket 7, the slot being long enough to not obstruct the free rotation of the head 32 during the opening and closing movement of the trap door when the spring is not tensioned, that is, when the trap door and steps balance without spring tension. In Figure 4, which is an enlarged view taken on line 4—4, Figure 2, the parts are in their positions assumed, when the trap door and steps are open. If the trap door should be initially too heavy for the proper balancing of the trap door and the steps, the spring 30 is tensioned in such direction as to tend to open the trap door. If the trap door should be too light for the proper balancing of the trap door and the steps, the spring is tensioned in the opposite direction to, in effect, increase the weight of the trap door and its tendency to close.

The trap door and the steps may initially balance each other properly, so that when the latch 16 is released, the steps 4 will slightly overbalance the trap door and cause the trap door to partly open. However, during the continued use of the structure, under some conditions, additional friction may develop and under other conditions, friction in the hinge or pivot bearings decrease so that it is necessary to tension the spring in one direction or the other to maintain the slightly overbalancing effect of the steps on the trap door.

Owing to the fact that a predetermined balancing effect is obtained as nearly as possible, by the relative avoirdupois weights of the trap door and the steps, a spring under slight tension only is necessary to adjust and maintain the predetermined balance, and hence, there is only a remote liability of the spring breaking. In trap door constructions, the springs, because of the fact that they are under comparatively great tension are liable to break. In combined trap door and step constructions relying only on a spring or springs, either in the trap door or in the steps or in both, the springs are initially under such tension that they are liable to break frequently.

In order to insure that the flight of steps will be held solidly in open position and will not give or vibrate when the passengers are using them and thus give the user a sense of insecurity, adjustable stop means is provided. This means, as here shown, includes adjustable stop elements on the flange 15, as set screws 41, extending through the flange 15 and against which the flange 14 on the steps engage, when the steps are in open position. As here shown, two stop screws 41 are located to engage the flange 14 near opposite ends thereof or near opposite sides of the flight of steps or the stop screws are spaced apart in a direction widthwise of the steps. These screws 41 are adjustable different distances below the flange 15, so that the flange 14 comes up solidly against both stop screws, when the steps are folded or open. There may be any number of spaced apart stops or screws, but ordinarily two, located as described, are sufficient. These adjustable stops constitute an object of the invention, and by the use of these set screws, a connecting rod may be used without spring means or resiliency permitting it to elongate and shorten, as initially, a connecting rod of the proper length can be used or adjusted to the proper length by threading one of the clevises or heads, as the head 17, thereon the right distance for the installation, and locking it by means of a lock nut in its set position, or a connecting rod embodying a turn-buckle may be used. Thus, the connecting rod may be adjusted to the proper length for each installation and the set screws 41 adjusted correspondingly to hold the flight of steps 4 solidly when the trap door is fully open.

By this invention, the trap door and the steps are originally balanced, so that no spring is necessary, but a spring is applied as an emergency proposition in case the conditions vary during the use of the structure, and also to initially make up for any slight differences in the predetermined balancing effect that may be actually present when the trap door and steps are initially assembled.

What I claim is:

1. In a trap door and folding step construction for railway cars, the combination of a platform structure formed with a step passage, a flight of steps pivotally mounted on a horizontal axis to the platform structure within the passage and below the level of the platform structure, a trap door hinged to the platform structure at one side of the step passage and arranged to cover and uncover the step passage, motion transmitting connections between the trap door and the steps and operating to move the steps into operative position, as the trap door opens, and move the steps into inoperative position, as the trap door closes, the flight of steps being mounted on its pivotal axis to move by gravity toward operative position and thereby tend to move the door from closed position, and the door and steps being so mounted with respect to their pivotal axes that the avoirdupois weights thereof balance through the motion transmitting means, when the door assumes a partly open position, and releasable means for holding the trap door closed.

2. In a trap door and folding step construction for railway cars, the combination of a platform structure formed with a step passage, a step unit pivotally mounted on a horizontal axis to the platform structure within the passage and below the level of the platform, a trap door unit hinged to the platform structure at one side of the step passage and arranged to cover and uncover the step passage, motion transmitting connections between the trap door and the step units and operating to move the step unit into operative position, as the trap door unit opens, and move the step unit into inoperative position as the trap door unit closes, the step unit being mounted on its pivotal axis to move by gravity toward operative position and thereby tend to move the door unit from closed position, and the door and step units being so mounted with respect to their pivotal axes that the avoirdupois weights thereof balance through the motion transmitting means, when the door unit assumes a partly open position, releasable means for holding the trap door closed, and adjustable means connected to one of said units for varying the amount of the balancing action of one unit on the other, through said motion transmitting connections.

3. In a trap door and folding step construction for railway cars, the combination of a platform structure formed with a step passage, a step unit pivotally mounted on a horizontal axis to the platform structure within the passage and below the level of the platform, a trap door unit hinged to the platform structure at one side of the step passage and arranged to cover and uncover the step passage, motion transmitting connections between the trap door and the step units and operating to move the step unit into operative position, as the trap door unit opens, and move the step unit into inoperative position, as the trap door unit closes, the step unit being mounted on its pivotal axis to move by gravity toward operative position and thereby tend to move the door unit from closed position, and the door and step units being so mounted with respect to their pivotal axes that the avoirdupois weights thereof balance through the motion transmitting means, when the door unit assumes a partly open position, releasable means for holding the trap door unit closed, and a torsion spring connected to one of said units, an adjustable member to which the spring is connected, the adjustable member being normally idle, whereby the spring is without tension and being operable into various positions to tension the spring different degrees in one direction or the other and thereby adjust the counterbalancing action of one unit relatively to the other.

4. In a trap door and folding step construction for railway cars, the combination of a platform structure formed with a step passage, a step unit pivotally mounted on a horizontal axis to the platform structure within the passage and below the level of the platform, a trap door unit hinged to the platform structure at one side of the step passage and arranged to cover and uncover the step passage, motion transmitting connections between the trap door and the step units and operating to move the step unit into operative position as the trap door unit opens, and move the step unit into inoperative position as mounted on its pivotal axis to move by gravity the trap door unit closes, the step unit being mounted on its pivotal axis to move by gravity toward operative position and thereby tend to move the door unit from closed position, and the door and step units being so mounted with respect to their pivotal axes that the avoirdupois weights thereof balance through the motion transmitting means, when the door unit assumes a partly open position, releasable means for holding the trap door unit closed, and a torque spring arranged coaxially with the hinge of one of said units and anchored to said unit, a head to which the other end of the spring is anchored, and normally capable of free movement about the axis of and in synchronism with the unit to which the spring is anchored, said head being operable about the axis of the spring in either direction to tension the spring in one direction or the other, and means for anchoring the head from turning movement when the spring is tensioned, all whereby the head is operable to vary the tension of the spring and the amount of the balancing effect of one unit on the other through the motion transmitting connections.

5. In a trap door and folding step construction for railway cars, the combination of a platform structure formed with a step passage, a step unit pivotally mounted on a horizontal axis to the platform structure within the passage and below the level of the platform, a trap door unit hinged to the platform structure at one side of the step passage and arranged to cover and uncover the step passage, motion transmitting connections between the trap door and the step units and operating to move the step unit into operative position as the trap door unit opens and move the step unit into inoperative position as the trap door unit closes, the step unit being mounted on its pivotal axis to move by gravity toward operative position and thereby tend to move the door unit from closed position, and the door and step units being so mounted with respect to their pivotal axes that the weights thereof balance through the motion transmitting means, when the door unit assumes a partly open position, releasable means for holding the trap door unit closed, and a torsion spring connected to one of said units, an adjustable member to which the spring is connected, the adjustable member being normally idle, whereby the spring is without tension and being operable into various positions to tension the spring different degrees in one direction or the other, and thereby adjust the counterbalancing action of one unit relatively to the other, said motion transmitting connections including a spring means causing the same to lengthen during movement of the door unit when the step unit has reached operative position and to shorten during continued closing movement of the door unit after the step unit has reached inoperative position.

6. In a trap door and folding step construction for railway cars, the combination of a platform structure formed with a step passage, a step unit pivotally mounted on a horizontal axis to the platform structure within the passage and below the level of the platform, a trap door unit hinged to the platform structure at one side of the step passage and arranged to cover and uncover the step passage, motion transmitting connections between the trap door and the step units and operating to move the step unit into operative position as the trap door unit opens and move the step unit into inoperative position as the trap door unit closes, the step unit being mounted on its pivotal axis to move by gravity toward operative position and thereby tend to move the door unit from closed position, and the door and step units being so mounted with respect to their pivotal axes that the weights thereof balance through the motion transmitting means, when the door unit assumes a partly open position, releasable means for holding the trap door unit closed, and a torsion spring connected to one of said units, an adjustable member to which the spring is connected, the adjustable member being normally idle, whereby the spring is without tension and being operable into various positions to tension the spring different degrees in one direction or the other, and thereby adjust the counterbalancing action of one unit relatively to the other, said motion transmitting connections including a spring means causing the same to lengthen during continued movement of the door unit when the step unit has reached operative position and to shorten during continued closing movement of the door unit after the step unit has reached inoperative position, and means for coacting with the step unit for limiting the opening movement thereof before the door has reached its fully open position, and means for limiting the closing movement of the step unit before the door unit has reached its completely closed position.

EDWARD F. CHAFFEE.

CERTIFICATE OF CORRECTION.

Patent No. 2,124,872.                                           July 26, 1938.

EDWARD F. CHAFFEE.

It is hereby certified that error appears in the printed specification of the above numbered patent requiring correction as follows: Page 4, first column, line 33, claim 4, strike out the words "mounted on its pivotal axis to move by gravity"; and that the said Letters Patent should be read with this correction therein that the same may conform to the record of the case in the Patent Office.

Signed and sealed this 30th day of August, A. D. 1938.

Henry Van Arsdale

Acting Commissioner of Patents.

(Seal)